(12) United States Patent
Kollep et al.

(10) Patent No.: US 9,814,347 B2
(45) Date of Patent: Nov. 14, 2017

(54) BEVERAGE PREPARATION UNIT WITH SAFETY VALVE

(71) Applicant: Nestec S. A., Vevey (CH)

(72) Inventors: Alexandre Kollep, Lutry (CH); Philippe Dumur, Serraval (FR)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 15/303,407

(22) PCT Filed: May 8, 2015

(86) PCT No.: PCT/EP2015/060143
§ 371 (c)(1),
(2) Date: Oct. 11, 2016

(87) PCT Pub. No.: WO2015/173128
PCT Pub. Date: Nov. 19, 2015

(65) Prior Publication Data
US 2017/0035242 A1    Feb. 9, 2017

(30) Foreign Application Priority Data

May 12, 2014   (EP) .................................... 14167849

(51) Int. Cl.
*A47J 31/06* (2006.01)
*A47J 31/58* (2006.01)
*A47J 31/36* (2006.01)

(52) U.S. Cl.
CPC ............. *A47J 31/58* (2013.01); *A47J 31/368* (2013.01); *A47J 31/369* (2013.01)

(58) Field of Classification Search
CPC ......... A47J 31/369; A47J 31/58; A47J 31/368
USPC ..... 99/275, 281, 283, 294, 295; 137/624.13, 137/625.22, 625.65; 426/112, 115, 231, 426/433
See application file for complete search history.

(56) References Cited

U.S. PATENT DOCUMENTS

| | | | |
|---|---|---|---|
| 2004/0079237 A1* | 4/2004 | Denisart | A47J 31/36 99/275 |
| 2008/0302252 A1 | 12/2008 | O'Brien et al. | |
| 2011/0103779 A1 | 5/2011 | Baston | |
| 2011/0146329 A1* | 6/2011 | Kuehl | F25D 29/00 62/389 |
| 2013/0036914 A1 | 2/2013 | Icardi et al. | |

(Continued)

FOREIGN PATENT DOCUMENTS

| | | |
|---|---|---|
| DE | 102008007254 A1 | 8/2008 |
| DE | 102009048233 A1 | 4/2010 |
| WO | 2011053890 A2 | 5/2011 |

OTHER PUBLICATIONS

International Search Report, dated Aug. 12, 2015, in PCT/EP2015/060139, filed May 8, 2015.

(Continued)

*Primary Examiner* — Thien S Tran
(74) *Attorney, Agent, or Firm* — Dunlap Codding, P.C.

(57) ABSTRACT

Portable beverage preparation devices for preparing a beverage from an ingredients containing capsule are disclosed and include a beverage brewing unit and beverage dispensing means that includes a safety outlet valve. Also disclosed are systems that include the beverage preparation devices and receptacles for use with the beverage preparation devices.

14 Claims, 10 Drawing Sheets

(56) References Cited

U.S. PATENT DOCUMENTS

2013/0078342 A1   3/2013  Loebl
2013/0312617 A1   11/2013 Toporovsky

OTHER PUBLICATIONS

Written Opinion of the International Searching Authority, dated Aug. 12, 2015, in PCT/EP2015/060139, filed May 8, 2015.
International Search Report, dated Nov. 27, 2015, in PCT/EP2015/060142, filed May 8, 2015.
Written Opinion of the International Searching Authority, dated Nov. 27, 2015, in PCT/EP2015/060142, filed May 8, 2015.
International Search Report, dated Jun. 15, 2015, in PCT/EP2015/060143, filed May 8, 2015.
Written Opinion of the International Searching Authority, dated Jun. 15, 2015, in PCT/EP2015/060143, filed May 8, 2015.

* cited by examiner

BEVERAGE PREPARATION UNIT WITH SAFETY VALVE

CROSS REFERENCE TO RELATED APPLICATIONS/INCORPORATION BY REFERENCE STATEMENT

This application is a US national stage application filed under 35 USC §371 of International Application No. PCT/EP2015/060143, filed May 8, 2015; which claims priority to Application No. EP 14167849.0, filed May 12, 2014. The entire contents of the above-referenced application are hereby expressly incorporated herein by reference.

TECHNICAL FIELD

The presently disclosed and/or claimed inventive concept (s) relates to a system for preparing a beverage from a beverage ingredients containing capsule. In particular, the presently disclosed and/or claimed inventive concept(s) relates to a beverage preparation device comprising a dispensing safety valve arrangement.

BACKGROUND

Devices for preparation of a beverage such as coffee or tea from ingredients containing capsules are well-known in the prior art. These devices are generally stationary devices equipped with a liquid tank, a pump and heating means in order to provide pressurized, heated liquid through a capsule inserted into the device. The liquid is injected into the capsule and will interact with the ingredients provided in the capsule. The resulting beverage is then drained from the capsule and may be collected in a dedicated receiving vessel.

A drawback of the known systems is the fact that these devices are designed for stationary use only. This means that the device has to be placed at a fixed location within the household, close to a main power supply. In addition, the device has to be placed close to a water supply in order to enable filling or re-filling of the liquid into a liquid tank of the device. The beverage preparation can thus only be carried out at a predefined stationary location of the device.

Therefore, portable devices have been proposed which enable the preparation and provision of a hot beverage such as in particular a coffee beverage at remote places.

EP 1 277 428 for example relates to an espresso coffee machine designed for use in conjunction with a low-voltage power supply of a vehicle, the machine comprising a water reservoir connected to a pump to convey water to a heating element, which itself is connected to an extraction head for providing a portion of coffee. The extraction head of the device is arranged for pouring a predefined portion of coffee beverage from above into a provided receiving vessel.

US 2009/0029021 relates to a portable device for brewing a coffee beverage, the device comprising a water tank, a housing including a chamber presenting a hot water feed nozzle and an opening through which a fill of brew preparation can be inserted, a closure part for closing said chamber, means connected to the tank to act during a brewing cycle to deliver a certain volume of water that has been raised to a brewing temperature from said tank to said chamber, and a brew outflow orifice from which the resulting beverage may be poured into a suitable receiving vessel. The body of the device includes handle means enabling the outflow orifice to be placed, during the brewing cycle, to face down towards a receptacle such as e.g. a cup for collecting the beverage.

A drawback of the known devices is the fact the beverage preparation devices usually comprise a simple outlet orifice or outlet duct from which the beverage is drained into a dedicated receptacle by means of gravity or by means of tilting the beverage preparation device. In particular in the field portable devices, this may lead to residue of water and/or coffee beverage to be drained from a beverage brewing unit of the device to the outlet orifice during transport of the device.

Therefore, in view of the known prior art, a beverage preparation device is sought-after which overcomes the above-identified drawback of the prior art. In particular, an enhanced and safe closing of a fluid communication between a beverage brewing unit and an outlet orifice of the device is desired. In particular, a safe closing is desired when a receptacle is moved away from the dispensing area and/or disconnected from dispensing means to prevent projection or spillage of hot liquid. The presently disclosed and/or claimed inventive concept(s) offers additional benefits to the existing prior art, which will become apparent in the following description.

BRIEF DESCRIPTION OF THE DRAWINGS

Further features, advantages and objects of the presently disclosed and/or claimed inventive concept(s) will become apparent for a skilled person when reading the following detailed description of embodiments of the presently disclosed and/or claimed inventive concept(s), when taken in conjunction with the figures of the enclosed drawings.

DETAILED DESCRIPTION

Figure 1A:
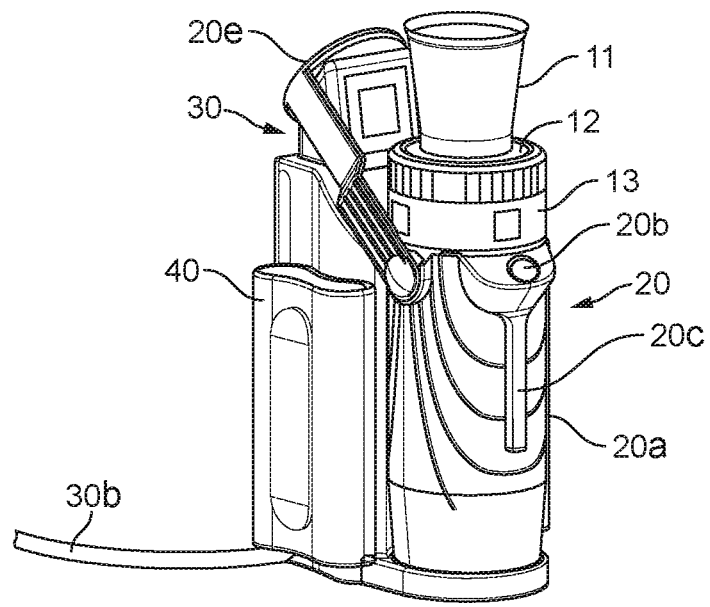
FIG. 1a is a perspective side view of a particular (but non-limiting) embodiment of the portable beverage preparation device being connected to a docking station.

In a first aspect, the presently disclosed and/or claimed inventive concept(s) relates to a beverage preparation device for preparing a beverage from an ingredients containing capsule, the device comprising a beverage brewing unit for receiving the capsule and preparing the beverage from the ingredients within the capsule by means of injection of pressurized liquid into the capsule, beverage dispensing means connected to the beverage brewing unit and designed for dispensing the resulting beverage from the device via a dispensing outlet, wherein the beverage dispensing means comprise a safety outlet valve adapted to selectively open a fluid communication from the beverage brewing unit to the outlet dependent on the presence and/or proximity of a receptacle being equipped with activation means for the outlet valve.

In certain non-limiting embodiments, the beverage preparation device is a portable device. However, the presently disclosed and/or claimed inventive concept(s) may also apply to a stationary device.

It is noted that the term "portable" beverage preparation device is to be understood as suitable for being used at remote places by contrast to a stationary beverage preparation device. In particular, the device is adapted for being easily and conveniently carried by a human such as by hand or a small suitcase without embarking a high water volume reservoir.

The presently disclosed and/or claimed inventive concept(s) enables the selective opening of the fluid communication between the beverage brewing unit and the beverage dispensing outlet of the device in dependency of the presence and/or proximity of activation means that are provided in a receptacle into which the resulting beverage is to be dispensed. In certain non-limiting embodiments, the safety outlet valve is designed for being opened upon bringing a receiving receptacle for the resulting beverage in proximity of the safety outlet valve respectively in proximity of the dispensing outlet of the device. According to such arrangement, the fluid communication from the brewing unit to the dispensing outlet is selectively opened only in case of the receiving receptacle being engaged with the dispensing outlet.

In a particular (but non-limiting) embodiment, the safety outlet valve is designed for being magnetically engaged by the activation means. In particular, the safety outlet valve is, in certain non-limiting embodiments, designed to open the fluid communication upon magnetic engagement by the activation means of the receptacle. A magnetic engagement between the activation means and the safety outlet valve, in certain non-limiting embodiments, takes place only in case the activation means are brought in close proximity to the safety outlet valve. Thereby, the term "close proximity" relates to a particular (but non-limiting) distance between the activation member and the safety outlet valve at which a magnetic interaction between different magnetic poles arranged within the respective entities may still occur.

In certain non-limiting embodiments, the safety outlet valve is arranged below a support surface of the beverage preparation device for the receptacle. Thereby, in certain non-limiting embodiments, the beverage dispensing outlet of the device is arranged to protrude from the support surface of the device. In certain non-limiting embodiments, the support surface of the beverage preparation device comprises a planar, for example, circular surface. Thereby, in certain non-limiting embodiments, the beverage dispensing outlet protrudes perpendicular to the support surface. The support surface may be designed for connecting to a top and/or bottom portion of the receptacle.

The support surface and the dispensing outlet may be comprised by a lid member of the device, which lid member is, in certain non-limiting embodiments, adapted to be selectively connectable to a housing of the device. Thereby, the lid member may form part of the beverage brewing unit. The safety outlet valve may be arranged within the lid member.

In certain non-limiting embodiments, the safety outlet valve is arranged such as to magnetically engage with activation means of the receptacle in case the receptacle is brought into contact with the support surface. Thereby, a magnetic interaction between the activation means and the safety outlet valve takes place, in certain non-limiting embodiments, upon bringing an outer face of the receptacle such as e.g. the bottom portion comprising the activation means in contact with the support surface.

Accordingly, in case the receptacle is brought in contact with the support surface of the device, the activation means will magnetically interact with the safety outlet valve in order to enable a beverage flow from the beverage brewing unit of the device to the dispensing outlet and thus into the receptacle. Due to such arrangement, a proper fitting is ensured between the receptacle and the dispensing means so that spilling of liquid from the dispensing outlet is prevented. Further, in case the receptacle is distanced from the support surface and thus from the dispensing outlet, the safety outlet valve will close again the fluid communication to the dispensing outlet, thereby enabling an automatic and convenient closure of the dispensing means of the device. Accordingly, the leakage of residue of beverage or water from the device during storing or transport thereof is effectively prevented.

In a particular (but non-limiting) embodiment, at least a portion of the safety outlet valve is arranged movable in a direction essentially perpendicular to the support surface. Thereby, in certain non-limiting embodiments, the safety outlet valve is of essentially disc-shaped form.

In a particular (but non-limiting) embodiment, the safety outlet valve is biased in a closing position in a direction away from the support surface. For this purpose, in certain non-limiting embodiments, the safety outlet valve comprises at least one biasing spring member that is arranged between the support surface and the safety outlet valve.

In a particular (but non-limiting) embodiment, the safety outlet valve may comprise a movable element having an essentially disc-shaped body with an inner liquid channel that is arranged moveable within an outer guiding element comprising radial flow passages. In certain non-limiting embodiments, the radial flow passages are arranged for being selectively closed upon movement of the disc-shaped element with respect to the guiding element.

In certain non-limiting embodiments, the safety outlet valve is made from plastic material comprising specifically arranged ferromagnetic substances.

In a particular (but non-limiting) embodiment, the safety outlet valve comprises a plurality of magnetic substances arranged about the circumference of the outlet valve. Thereby, in certain non-limiting embodiments, the plurality of magnetic substances present alternating magnetic poles arranged about the circumference of the valve.

In certain non-limiting embodiments, the beverage preparation device according to the presently disclosed and/or claimed inventive concept(s) is designed for preparing espresso-type coffee at high pressure requiring high water pressure supply and high water temperature setting.

In certain non-limiting embodiments, the beverage preparation device comprises a pump, a heating unit, and a liquid reservoir connected to the pump and the heating unit. Accordingly, hot pressurized liquid may be provided to the beverage brewing unit of the device. In certain non-limiting embodiments, the device is designed for preparing a beverage at a high pressure of between 10 to 15 bar. In certain non-limiting embodiments, the heating means of the device comprises two cartridge heaters designed for being supplied with 12 to 15 Volts nominal voltage. In certain non-limiting embodiments, the pump of the device is a membrane pump. In certain non-limiting embodiments, the pump is vibration-decoupled from a housing of the device.

A further aspect of the presently disclosed and/or claimed inventive concept(s) relates to a portable beverage preparation device for preparing a beverage from an ingredient containing capsule, the device comprising a beverage brewing unit for receiving the capsule and preparing the beverage from the ingredients within the capsule by means of injection of pressurized liquid into the capsule, a lid member selectively connectable to the brewing unit in order to enclose a capsule provided thereto, wherein the lid member comprises, in certain non-limiting embodiments, a beverage dispensing outlet designed to selectively connect to a portion of a receptacle such as the bottom of the receptacle, and wherein the beverage brewing unit is arranged moveable within a housing of the device such as to selectively open a fluid-connection from the brewing unit to a fluid reservoir of the device.

Accordingly, in case of the open fluid-connection from the brewing unit to the fluid reservoir, refilling of the fluid reservoir of the device via filling of liquid into the empty brewing unit is enabled. A user may thus remove the lid member from the brewing unit respectively the housing of the device and simply fill a predefined amount of liquid into the brewing unit in order to refill the liquid reservoir. Hence, a dedicated separate aperture or valve means at the device suitable for refilling purposes of the liquid reservoir may be omitted.

In a particular (but non-limiting) embodiment, the fluid-connection from the brewing unit to the fluid reservoir is opened dependent on the provision of the lid member to the device respectively the brewing unit. Thereby, in case no lid member is arranged at the device, in certain non-limiting embodiments, the beverage brewing unit is urged in a direction away from the fluid reservoir such as to open a dedicated valve means, e.g. an annular passage enabling fluid flow from the beverage brewing unit to the liquid reservoir. This may be obtained by spring members that are arranged at the brewing unit. Upon closing of the lid member onto the device respectively the brewing unit, the brewing unit is urged in a direction towards to fluid reservoir, whereby the valve means, e.g. the annular fluid passage from the brewing unit to the liquid reservoir is closed.

In a further aspect, the presently disclosed and/or claimed inventive concept(s) relates to a system comprising a portable beverage preparation device as described above, the system further comprising a receptacle, wherein the receptacle comprises activation means designed to magnetically engage the safety outlet valve.

The presently disclosed and/or claimed inventive concept (s) relates also to a receptacle for use with the beverage preparation device of the presently disclosed and/or claimed inventive concept(s).

In a particular (but non-limiting) embodiment, the activation means are arranged in a bottom portion of the receptacle. In certain non-limiting embodiments, the activation means comprise magnetic material arranged at the bottom portion of the receptacle, such as (but not limited to) at the circumference of the bottom portion. Thereby, in certain non-limiting embodiments, the arrangement of the magnetic material is conformal with the arrangement of the magnetic material provided in the safety outlet valve of the device.

In certain non-limiting embodiments, and as present in the safety outlet valve, magnetic material provided in the receptacle may be arranged such as to present alternating magnetic poles arranged about the circumference of the valve. According to such arrangement, dependent on the rotational orientation of the receptacle with respect to the safety valve means of the device, an attraction or a rejection between the receptacle and the safety outlet valve will take place.

In certain non-limiting embodiments, the receptacle according to the presently disclosed and/or claimed inventive concept(s) is equipped with a central inlet means designed for engaging the dispensing outlet of the device. In certain non-limiting embodiments, the inlet means are integrally formed in the bottom wall of the receptacle. The inlet means may for example be a valve or a self-closing membrane. In certain non-limiting embodiments, the closing strength of the valve or the membrane is selected to ensure that it can withstand at least the pressure exerted on it by liquid in the receptacle, in case the receptacle is filled completely, without any leakage.

Figure 1B:
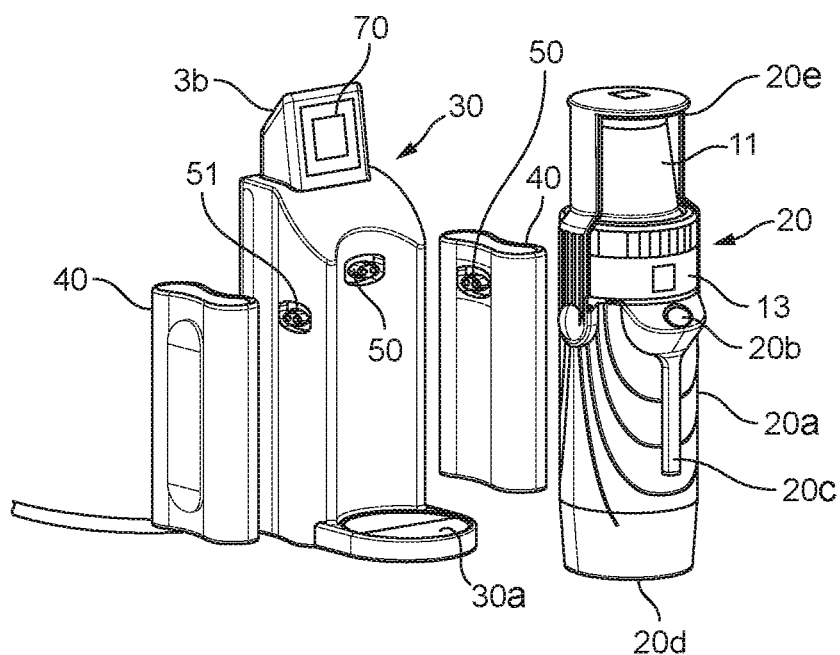
FIG. 1b is a perspective exploded assembly drawing of a system comprising the portable beverage preparation device as shown in FIG. 1a, a docking station and a battery unit.

FIGS. 1a and 1b show perspective side views of a particular (but non-limiting) embodiment of the portable beverage preparation device 20. The device 20 is adapted for being electrically and mechanically connected to a docking station 30 which is electrically connected to the mains via a power cable 30b. The docking station 30 is adapted to support battery units 40 which are designed for being electrically and mechanically connected to the docking station via connecting members 50,51.

The beverage preparation device 20 itself also comprises an electric connection means 51 (see FIG. 2) to which the docking station 30 or a battery unit 40 may be connected. Further, a power cable (not shown) may as well be connected to the electric connection means 51 of the device 20 for providing the device with power.

In certain non-limiting embodiments, the device 20 comprises a housing 20a and a lid member 13 arranged at a top portion of the housing 20a. The lid member comprises an upper support surface 12 on which a receptacle 11 may be arranged. In certain non-limiting embodiments, the receptacle 11 and the support surface 12 are designed for enabling a support of the receptacle 11 in an operating state of the device as shown in FIG. 1a, as well as in a transport state of the device as shown in FIG. 1b.

In certain non-limiting embodiments, the device 20 is further equipped with a user interface 20b. In certain non-limiting embodiments, the user interface comprises at least a start/stop button for enabling a user to selectively start and stop the beverage preparation by means of the device. In certain non-limiting embodiments, the device further comprises a window 20c for enabling a user to control the liquid level in a liquid reservoir 8 (see FIG. 2) of the device.

In certain non-limiting embodiments, the device 20 comprises an essentially vertical cylindrical form. In an operating state, the device stands, in certain non-limiting embodiments, on a round front respective bottom surface 20d. In certain non-limiting embodiments, the bottom surface 20d and a support surface 30a of the docking station 30 are of conformal shape in order to guarantee a stable positioning of the device 20 when being connected to the dockings station 30.

In certain non-limiting embodiments, the device 20 further comprises a handle 20e that is pivotally arranged at the housing 20a and extends from a central portion of the device towards an upper portion thereon. In certain non-limiting embodiments, the handle 20e extends upwardly beyond the support surface 12 of the lid member 13. Thereby, in certain non-limiting embodiments, the handle 20e is shaped to support the receptacle 11 during transport of the device such as e.g. indicated in FIG. 1b.

Figure 2:
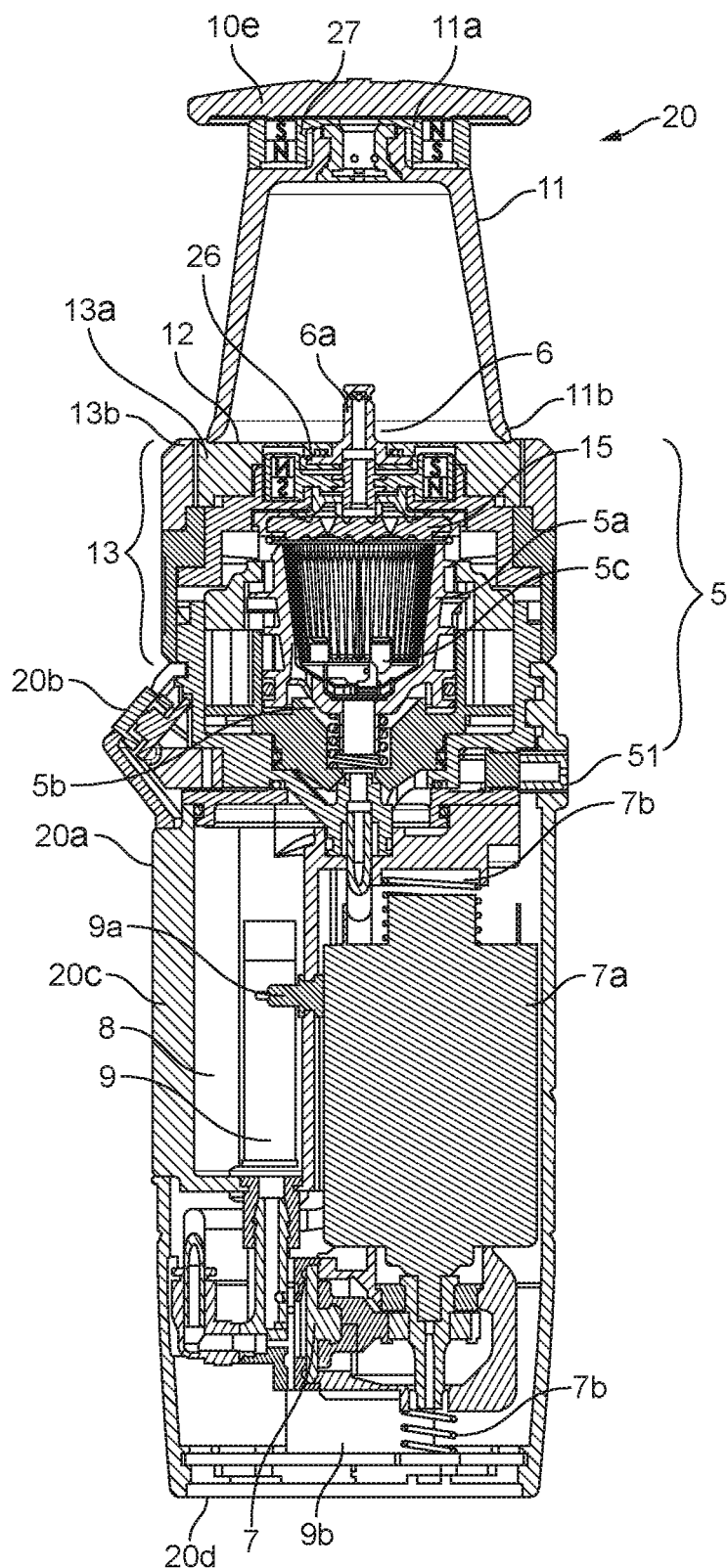
FIG. 2 relates to a sectional side view of a particular (but non-limiting) embodiment of the portable beverage preparation device in a storage or transport position.

FIG. 2 relates to a sectional side view of the device 20 in a transport or storage mode thereof. Thereby, the receptacle 11 is placed with its circumferential upper edge 11b on the support surface 12 of the device. The support surface 12 may have dedicated engagement means such as a circular protrusion enabling a clamping engagement with the edge 11b of the receptacle. As further indicated in the figure, the handle 20e is arranged to press against the bottom 11a of the receptacle. Accordingly, the receptacle 11 may be safely retained between the handle 20e and the support surface 12 of the device during transport and storage.

The device comprises a pump 7 such as a membrane pump, and which is connected to a motor 7a. In certain non-limiting embodiments, the pump 7 and/or the motor 7a are vibration-decoupled from the housing 20, e.g. by means of springs 7b. The device further comprises a liquid reservoir 8 that is in fluid connection with the pump 7, and a heating means 9. The heating means 9 may comprise a temperature sensor 9a. In certain non-limiting embodiments, the device also comprises a control unit 9b connected to at least the pump 7, the heating means 9 and the user interface 20b.

In certain non-limiting embodiments, the device further comprises a beverage brewing unit 5 arranged at an upper portion of the device 20. In certain non-limiting embodiments, the brewing unit 5 comprises a capsule injection cage 5a that has a conformal shape to a capsule 10 to be received therein. In certain non-limiting embodiments, the injection cage 5a has an essentially bell-shaped form at which circumference linear protrusions may be formed as indicated in the figure. These may enable a facilitated removal of the capsule from the cage 5a after beverage preparation.

The brewing unit 5 further comprises liquid inlet means 5b connected to the liquid reservoir 8, the pump 7 and the heating means 9 of the device. In certain non-limiting embodiments, the brewing unit 5 also comprises opening means 5c such as a piercing member or cutting blade, which is adapted for opening an inlet face 10a of a capsule 10 if placed within the brewing unit 5.

In certain non-limiting embodiments, an upper portion of the brewing unit 5 is formed by the removable lid member 13 which may be selectively connected to the lower portion of the brewing unit 5. The lid member 13 comprises an outer circumferential lid portion 13b and an inner central lid portion 13a which are arranged freely rotatable relative to each other. The lid member 13, in particular the inner central lid portion 13a is equipped with opening means 15 arranged for opening an outlet face 10b of the capsule 10 during the beverage preparation process. In certain non-limiting embodiments, the opening means 15 is a pyramidal plate comprising a horizontally arranged base plate from which a plurality of small protrusions 15a are directed downwards in direction of the outlet face 10b of the capsule 10 (see FIG. 3c). In case of increasing pressure within the capsule 10, an outlet face 10b thereof will be urged against the pyramidal plate 15 and will then tear at its protrusions 15a. The pyramidal plate 15 further comprises small liquid channels 15b enabling a fluid flow from the plate 15 towards a liquid dispensing means 6 of the lid member 13.

In certain non-limiting embodiments, the liquid dispensing means 6 are comprised by the lid member 13 and enable a fluid flow from the beverage brewing unit 5 towards the receptacle 11. The dispensing means 6 are arranged vertically above the brewing unit 5 of the device. The dispensing means 6 comprise a beverage outlet 6a protruding from the support surface 12 for the receptacle 11. In certain non-limiting embodiments, the beverage outlet is an injection member that is arranged central at the support surface 12.

The liquid dispensing means 6 further comprise a safety outlet valve 26 adapted to selectively open a fluid communication from the beverage brewing unit 5 to the outlet 6a dependent on the presence and/or proximity of a receptacle 11 being equipped with activation means 27 for the outlet valve 26.

Figure 3A:
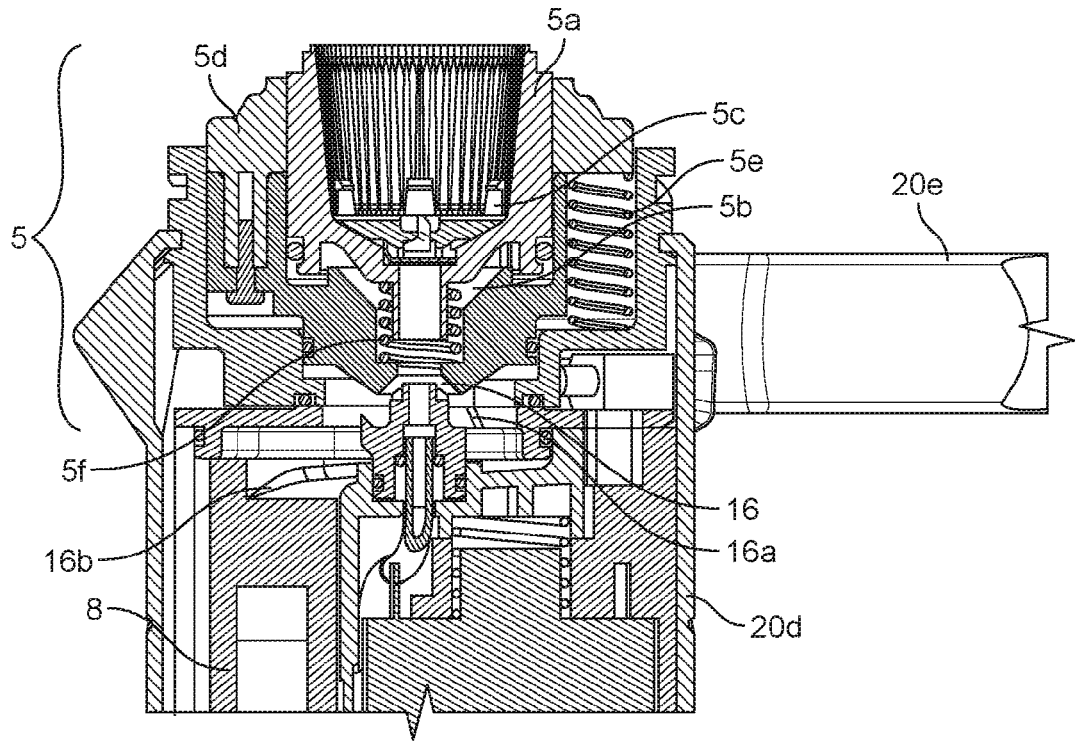
FIGS. 3a to 3c are sectional side views of the portable beverage preparation device during provision of a capsule into the brewing unit of the device.

FIG. 3a relates to a sectional side view of the device when the lid member 13 was removed from the housing 20.

In certain non-limiting embodiments, the beverage brewing unit 5 is arranged movable within the housing 20a. In particular, an external cage block 5d (see also FIG. 4b) holding the capsule injection cage 5a is arranged movable within the device 20. In certain non-limiting embodiments, the injection cage 5a is also arranged movable with respect to the cage block 5d, e.g. by means of a central spring member 5f.

In certain non-limiting embodiments, the cage block 5d holding the injection cage 5a is arranged vertically movable within the housing 20a by means of dedicated resilient means 5e such as e.g. springs. In certain non-limiting embodiments, the springs 5e are homogenously arranged at the circumference of the cage block 5d (see also FIG. 4b). In certain non-limiting embodiments, the cage block 5d is moveable between a lower position as shown in FIG. 2 in case of the lid member 13 being connected to the housing 20a and an upper position as shown in FIG. 3a, when no lid member 13 is connected to the housing 20. In its upper position, a fluid passage 16 between the injection cage 5a and the liquid reservoir 8 is opened. In particular an annular passage 16 is provided in the fluid communication from the pump 7 to the injection cage 5a, which enables the direction of fluid provided into the injection cage 5a to the liquid reservoir 8. Thereby, dedicated guiding means such as a liquid passage 16a and a guiding channel 16b are in fluid communication with the annular passage 16 in order to re-direct fluid provided from above in the injection cage 5a to the liquid reservoir 8. The cage block 5d may further comprise air exhausting means 25 (see FIG. 4b) designed for enabling a circulation of air between the liquid reservoir 8 and the exterior of the housing 20. According to such arrangement, the user may remove the lid member 13 from the brewing unit 5 and may fill liquid such as water directly into the capsule injection cage 5a for re-filling the liquid reservoir 8. As an alternative to such arrangement, a dedicated refill-aperture may be provided at the housing 20a of the device.

Figure 3B:
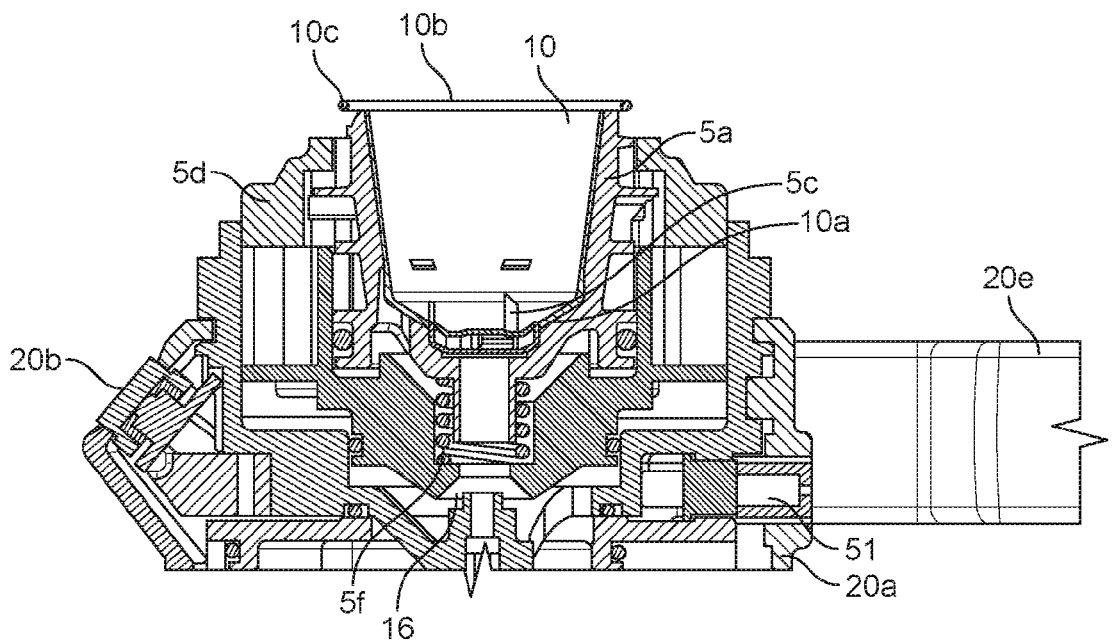

FIG. 3b relates to a sectional side view of the device 20 when a capsule 10 comprising beverage ingredients has been provided to the capsule injection cage 5a. In certain non-limiting embodiments, the capsule 10 is made from aluminium. However, the capsule may as well be made from plastic or biodegradable material. In certain non-limiting embodiments, the capsule 10 comprises a rotational-symmetric truncated-cone shaped body having an inlet face 10a and an outlet face 10b. The outlet face 10b is connected to a circumferential flange-like rim portion 10c of the capsule. Opening means 5c of the injection cage 5a (such as blades) are arranged to open respectively pierce the inlet face 10a of the capsule as depicted in FIG. 3b. When inserted into the device 20, the capsule outlet face 10b is arranged at an uppermost portion of the capsule. The inlet face 10a is arranged at a lowermost portion of the capsule.

Figure 3C:
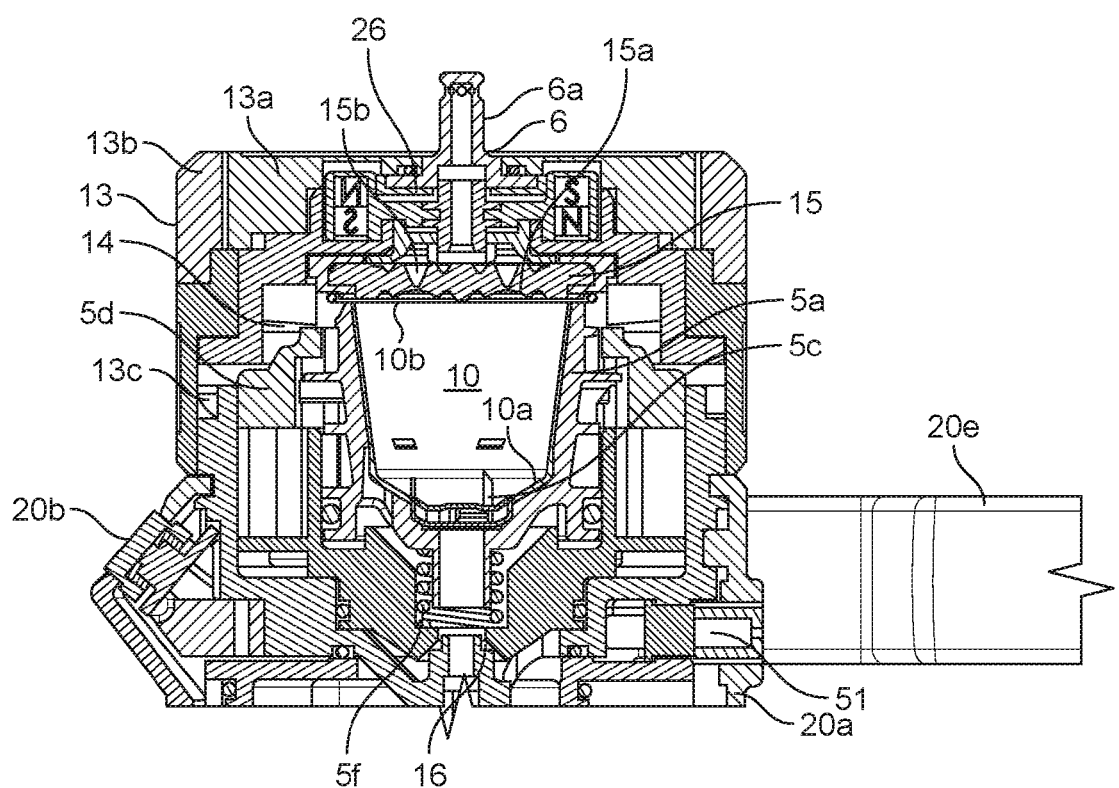

In case the lid member 13 is re-connected to the housing 20a as shown in FIG. 3c, the capsule 10 as previously provided to the capsule cage 5a is enclosed in the brewing unit 5 by means of the capsule cage 5a and the pyramidal plate 15 of the lid member 13. Thereby, the pyramidal plate 15 presses against the upper outlet face 10b. The lid member 13 may be connected to the housing 20a by means of a helical path 13c enabling a translatory motion of the lid member in downwards direction upon rotation of the outer part 13b of the lid member 13 with respect to housing 20a. Note that the liquid passage 16 between the capsule injection cage 5a and the liquid reservoir 8 is (re-)closed due to the external cage block 5d being pushed in a downward direction as the lid member 13 is connected to the housing 20a.

Further, upon (re-)connecting the lid member 13 with the housing 20a, the inner lid portion 13a will interact with rotation-prevention means 14 arranged at the beverage brewing unit 5 and in particular at the external cage block 5d thereof (see also FIG. 4a), in order to prevent a relative movement of the inner lid portion 13a and the capsule 10 arranged within the beverage brewing unit 5. Thereby, the inner lid portion 13a may comprise dedicated serrations or protrusions 13d (see FIG. 4c) that interact with the rotation-prevention means 14 of the brewing unit 5. Due to the inner portion 13a being freely rotationally movable with respect to the outer portion 13b of the lid member 13, a complete closure of the lid member 13 onto the housing 20a is enabled. When the lid member 13 is then disengaged from the housing 20a after the beverage preparation, the central portion of the lid member 13 is prevented from rotation with respect to the capsule 10 and thus, the pyramidal plate 15 is prevented from further rupturing respectively from destroying the outlet face 10b of the capsule 10.

Figure 3D:
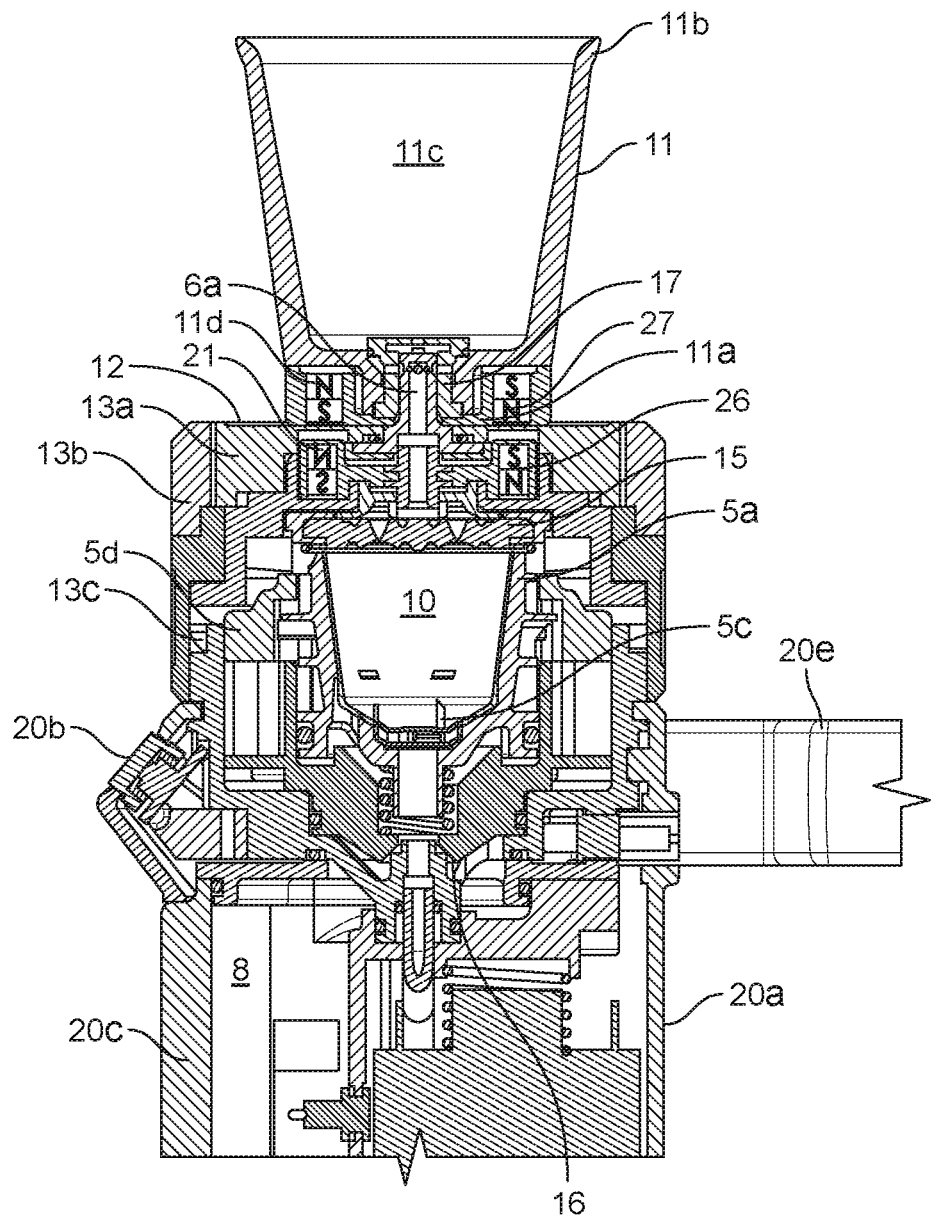
FIG. 3d is a partial sectional side view of the device in an operation state of the device, i.e. during beverage production.

FIG. 3d relates to an operating position of the beverage preparation device 20 according to the presently disclosed and/or claimed inventive concept(s). Thereby, the receptacle 11 is connected to the beverage dispensing means 6 of the device. This is obtained via valve means 17 arranged in a bottom portion 11a of the receptacle 11 which interact with the dispensing outlet respectively injection member 6a of the dispensing means 6. In particular, the injection member 6a when being connected to the bottom portion 11a urges the valve means 17 upwardly in order to enable a fluid communication between the injection member 6a and the interior of the receptacle 11c.

Further, in certain non-limiting embodiments, the receptacle 11 comprises activation means 27 designed to interact with a safety outlet valve 26 of the device 20 as will be explained in more detail with respect to FIGS. 6a and 6b below.

In case the user starts the beverage preparation by means of the user interface 20b, the pump 7 will provide heated pressurized liquid, in particular water, into the beverage brewing unit 5 via dedicated tubing of the device. The liquid will be provided to the capsule cage 5a, to the opening(s) created within the inlet face 10a of the capsule 10 and thus to the interior of the capsule 10. The pressure rise within the capsule leads to a deformation of the outlet face 10b against the pyramidal plate 15 due to which the outlet face 10b ruptures. A beverage resulting from the interaction of the liquid with the ingredients contained in the capsule 10 will then be urged upwardly, against gravity, in direction of the beverage dispensing means 6. Due to the established connection between the dispensing means 6 and the interior of the receptacle 11, the resulting beverage will be provided through the bottom portion 11a of the receptacle 11 into the interior 11c thereof. In certain non-limiting embodiments, the control unit 9b of the device stops the provision of liquid to the brewing unit 5 after a predefined amount of liquid was provided thereto. Due to the direct provision of the resulting beverage through the bottom portion 11a of the receptacle, spilling of the beverage is effectively prevented. It is noted that the fluid flow of the beverage in particular from the brewing unit 5 to the interior 11c of the receptacle 11 is, in certain non-limiting embodiments, in a common direction, in particular in a direction essentially opposite to gravity. Accordingly, in certain non-limiting embodiments, the fluid flow direction does not change from in particular the brewing unit 5 to the receptacle 11.

Figure 4A:
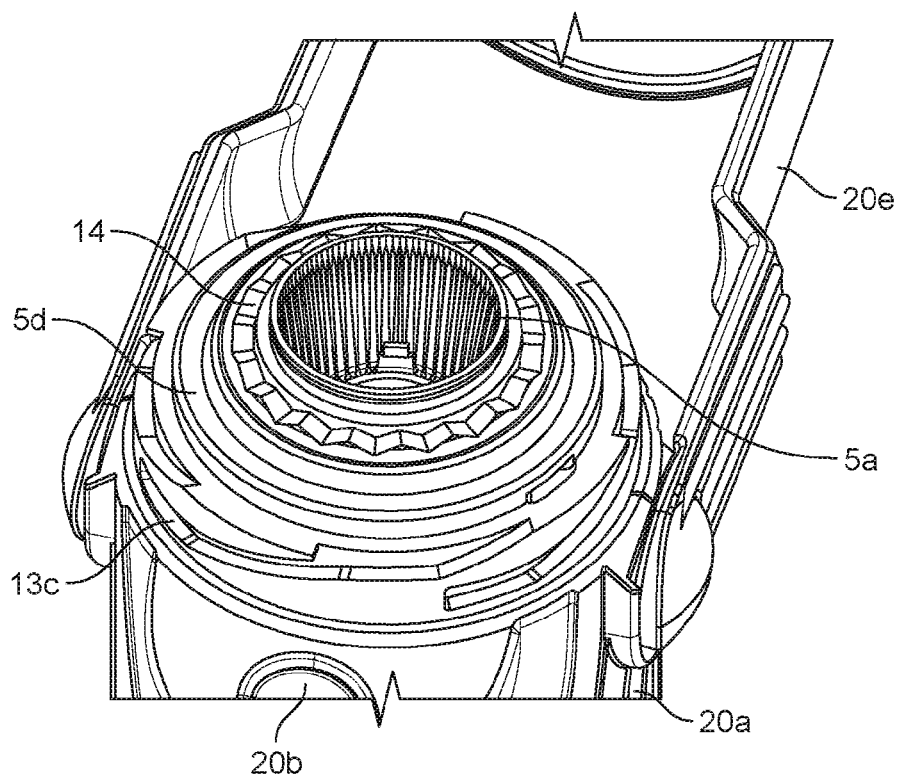
FIG. 4a is a perspective view from above of a particular (but non-limiting) embodiment of the beverage brewing unit of the beverage preparation device (lid member removed).

FIG. 4a relates to a perspective side view onto the capsule cage block 5d and the capsule injection cage 5a when being inserted into the housing 20a of the device. As can be seen in the figure, serrations 14 are, in certain non-limiting embodiments, arranged about the circumference of an upper surface of the capsule cage block 5d, which act as rotation-prevention means when being engaged by the central portion 13a of the lid member 13.

Figure 4B:
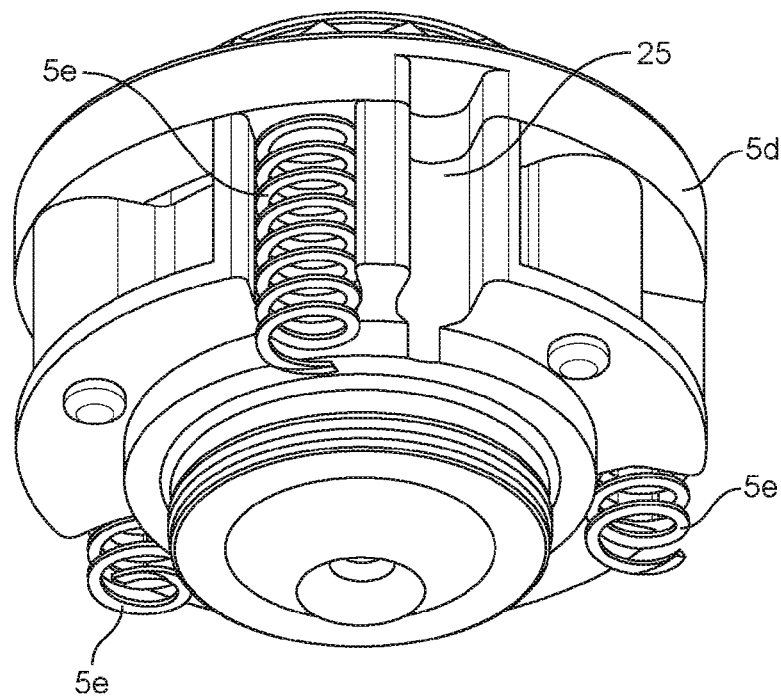
FIG. 4b is a perspective view from below of a particular (but non-limiting) embodiment of (part of) the beverage brewing unit of the device.

FIG. 4b relates to a perspective side view onto the capsule cage block 5d when being disconnected from the housing 20a. The cage block 5d comprises springs 5e arranged about the circumference of the block 5d and which are designed to urge the cage block 5d in an upwards direction in case the lid member 13 is not connected to the housing 20a.

Figure 4C:
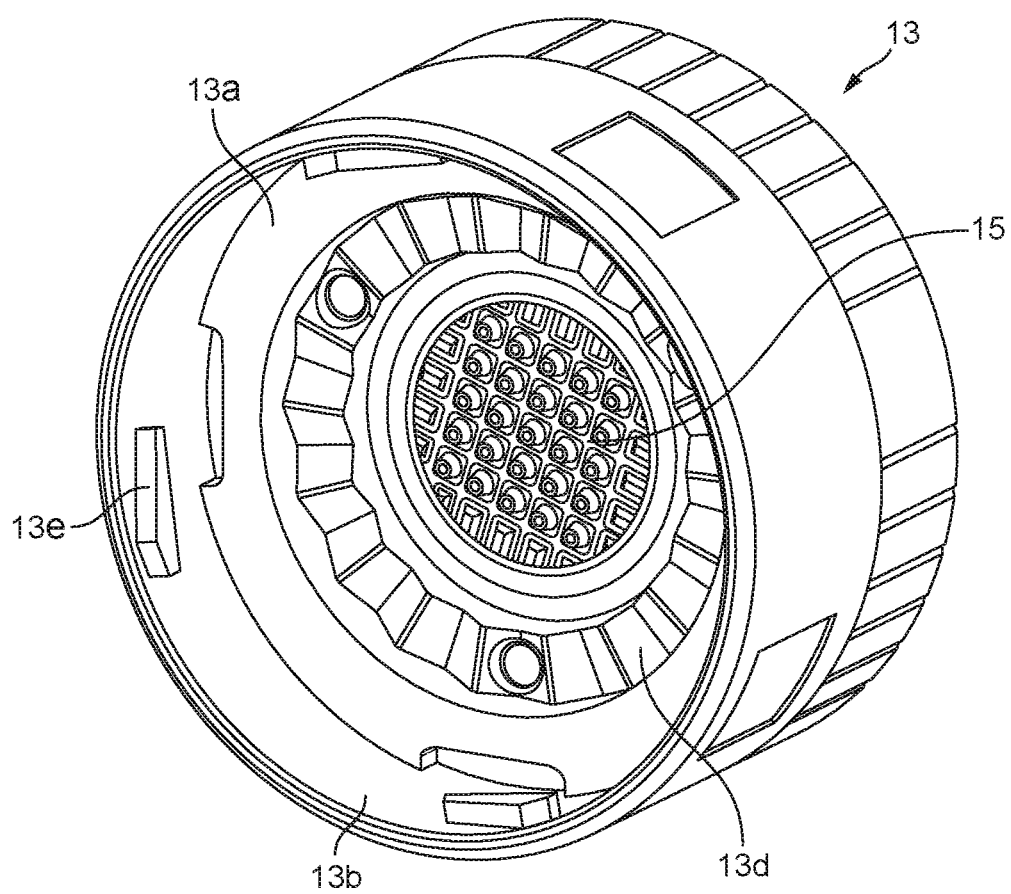
FIG. 4c is a perspective side view of a particular (but non-limiting) embodiment of a lid member for being connected to the housing of the device.

FIG. 4c relates to perspective bottom view of the lid member 13 in which the annular protrusions respectively serrations 13d are indicated. The serrations 13d protrude from a lower surface arranged at the circumference of the pyramidal plate 15 and are designed to interact with serrations 14 of the cage block 5d (see FIG. 4a). As shown in the figure, an inner surface of the outer lid portion 13b comprises connecting members 13e designed to interact with recessions 13c at the housing 20a of the device (see FIG. 3d) for connecting the lid member 13 to housing 20a.

Figure 5A:
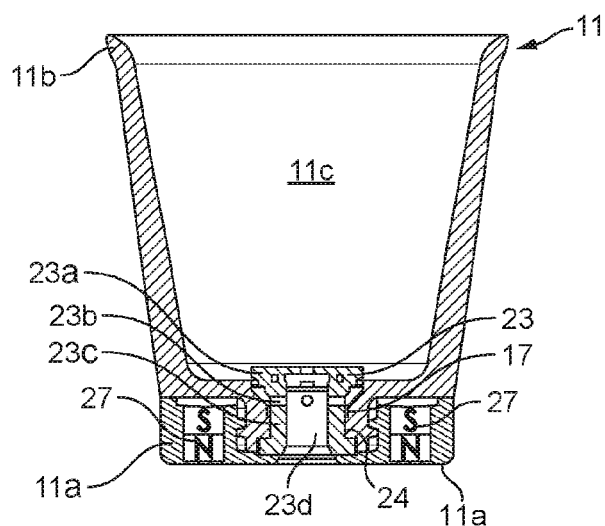
FIGS. 5a and 5b relate to a particular (but non-limiting) embodiment of a receptacle for being connected to the device according to the presently disclosed and/or claimed inventive concept(s), the receptacle comprising selective openable valve means.
Figure 5B:
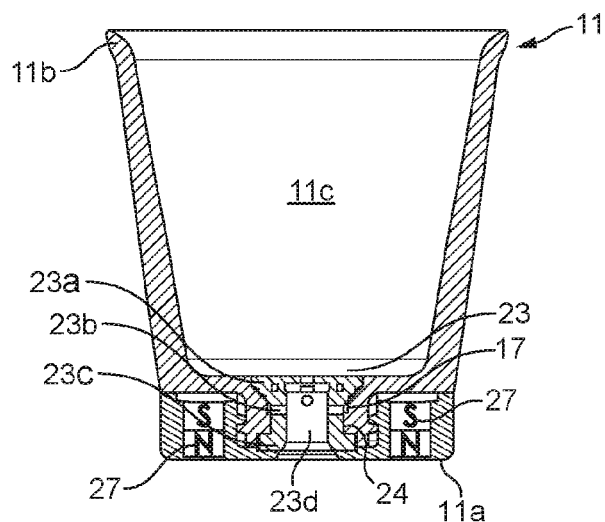

FIGS. 5a and 5b show the receptacle 11 designed for being connected to device 20. Thereby, FIG. 5a shows the valve means 17 of the receptacle in their open state and FIG. 5b relates to the valve means 17 being closed.

In certain non-limiting embodiments, the valve means 17 comprises an elastic part 23 that is extensible in vertical length when engaged by the beverage dispensing outlet respectively injection member 6a of the beverage dispensing means 6 of the device 20. Thereby, in certain non-limiting embodiments, the elastic part 23 comprises a lower part 23c that is fixed within an essentially vertical aperture 24 provided in the bottom portion 11a of the receptacle. Upon extension of the part 34 in an upwards direction due to the injection member 6a (not shown in the figure) being introduced into a vertical bore 23d of the part 23, an upper portion 23a of the part 23 extends beyond the vertical aperture 24 in the bottom portion 11a of the receptacle, such that fluid communication between the interior 11c of the receptacle 11 and the vertical bore 23d is enabled due to radially extending bores 23b within the elastic part 23. When the valve means 17 are disengaged from the protruding outlet respectively injection member 6a, the elastic part 23 will retract and thus close the radially extending bores 23b.

Figure 5C:
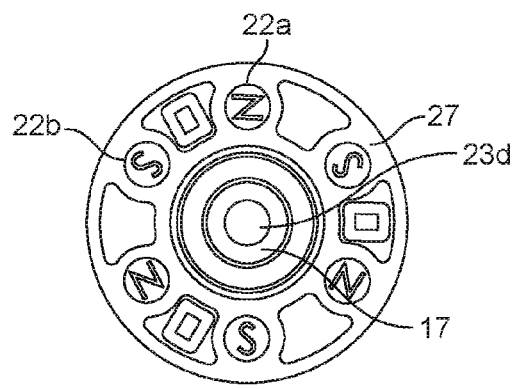
FIG. 5c relates to a bottom view of a particular (but non-limiting) embodiment of the receptacle as shown in FIGS. 5a and 5b.

As shown in FIGS. 5a to 5c, the receptacle comprises activation means 27 in the bottom portion 11a of the receptacle. In certain non-limiting embodiments, the activation means 27 are designed for magnetically interacting with a safety outlet valve 26 of the device 20 as will be described further with reference to FIGS. 6a and 6b below. In certain non-limiting embodiments, the activation means 27 are integrally formed within the bottom portion 11a. The activation means 27 may be as well be connected to a lower surface of the bottom portion 11a.

In certain non-limiting embodiments, the activation means 27 comprise a plurality of magnetic elements 22a,22b arranged at the circumference of the bottom portion 11a as indicated in FIG. 5c. Thereby, in certain non-limiting embodiments, the activation means 27 are provided in circular arrangement at the bottom portion 11a of the receptacle 11 about the central valve means 17. In certain non-limiting embodiments, the magnetic elements 22a,22b are arranged with alternating polarity as indicated by N for "north" and S for "south" in the circular arrangement as shown in FIG. 5c.

Figure 6A:
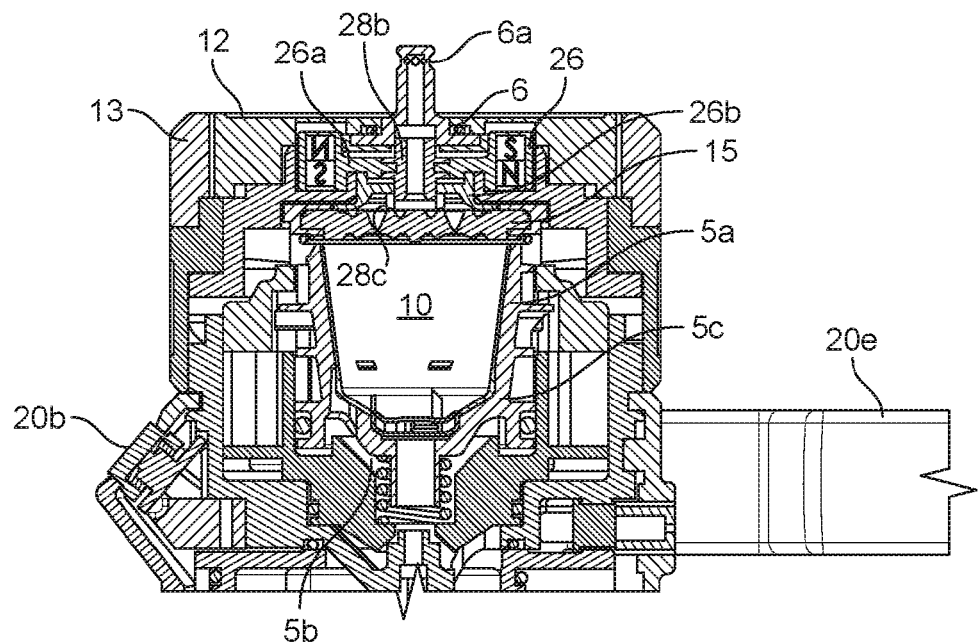
FIG. 6a relates to a sectional side view of a particular (but non-limiting) embodiment of the device comprising a safety outlet valve according to the presently disclosed and/or claimed inventive concept(s) in its closed state.

FIG. 6a relates to a sectional side view of an upper portion of the device 20. As shown in the figure, the safety outlet valve 26 of the device is arranged in a fluid path between the beverage brewing unit 5 and the dispensing outlet 6a. The safety outlet valve 26 is arranged below the support surface 12 of the device and may be integrally formed with the lid member 13.

Figure 7A:
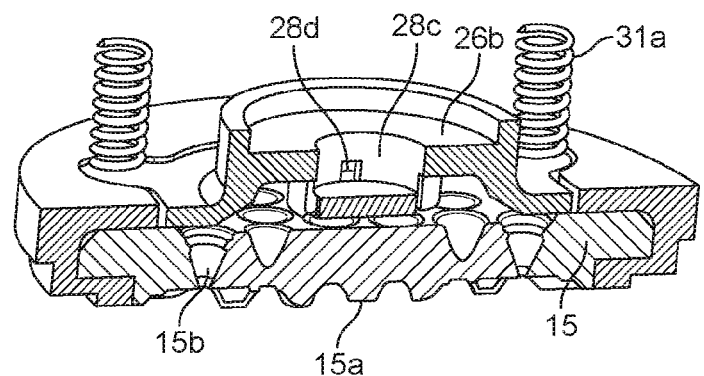
FIG. 7a relates to a perspective side view of a particular (but non-limiting) embodiment of an outer guiding element of the safety outlet valve according to the presently disclosed and/or claimed inventive concept(s).

The safety outlet valve 26 comprises an inner movable element 26a (see also FIG. 7b,7c) and an outer guiding element 26b (see also FIG. 7a) in which the inner movable element 26a is supported. Thereby, in certain non-limiting embodiments, the inner movable element 26a is of essentially disc-shaped form and comprises an inner flow passage 28a arranged within a tubular member 28b. The tubular member 28b is moveably supported within a guiding recess 28c that is coaxially arranged with the tubular member 28b. The guiding recess 28c comprises radially extending flow passages 28d that enable a fluid communication of a lower portion of the guiding element 26a to which the brewing unit 5 of the device is connected with the inner guiding recess 28c and thus with the inner flow passage 28a of the movable element 26a leading to the dispensing outlet 6a of the device. Dependent on the relative position of the movable element 26a with respect to the guiding element 26b, the flow passages 28d are open or blocked, thereby enabling a fluid communication between the beverage brewing unit 5 and the dispensing outlet 6a or not.

In a transport or storage state as shown in FIG. 6a of the device, biasing means 31b (see FIG. 7c) of the safety valve 26 urge the movable element 26a of the valve means 26 in a direction away from the support surface 12 and towards the guiding element 26b in order to close-off the flow passages 28d and thus the fluid path between the beverage brewing unit 5 and the dispensing outlet 6a.

Figure 6B:
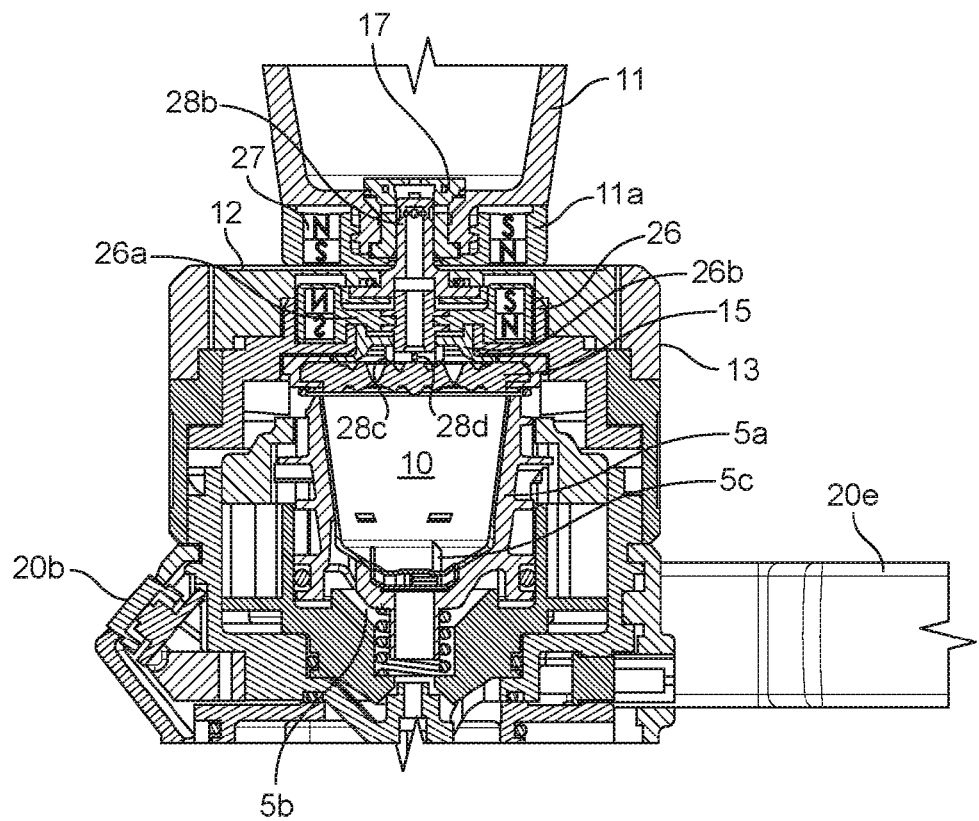
FIG. 6b relates to a sectional side view of the particular (but non-limiting) embodiment as shown in FIG. 6a, wherein the safety outlet valve is brought into its open state.
Figure 7B:
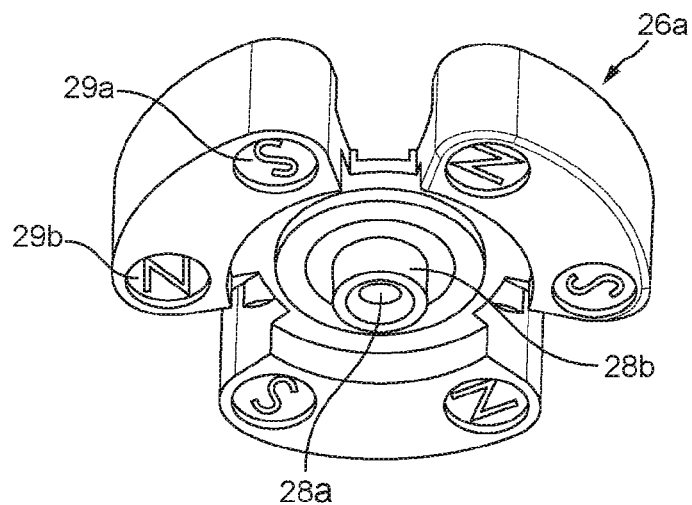
FIGS. 7b and 7c relates to a perspective side view of a particular (but non-limiting) embodiment of the movable element of the safety outlet valve.
Figure 7C:
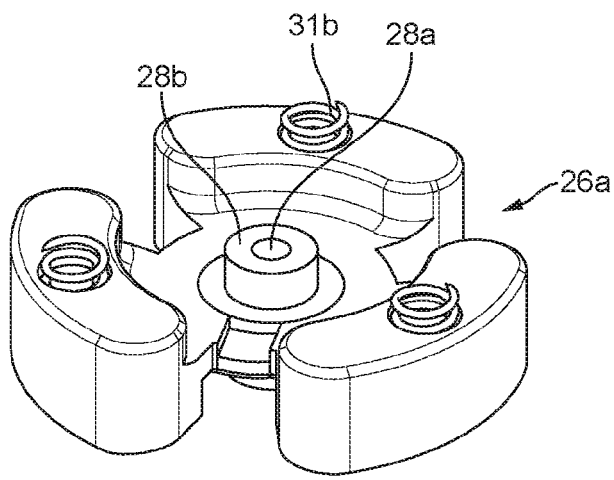

In case a receptacle 11 is placed into the support surface 12 as shown in FIG. 6b, the activation means 27 arranged at the bottom portion 11a of the receptacle 11 are brought into close proximity to the safety outlet valve 26, and thus, a magnetic interaction between the activation means 27 and the valve 26 takes place. In particular, a magnetic force of attraction will be present between the activation means 27 and magnetic elements 29a, 29b arranged at the movable element 26a of the valve, in case the relative rotational orientation of the receptacle 11 and the support surface 12 leads to different polarities between adjacent magnetic elements of the activation means 27 and the valve 26. Thereby, as indicated in FIG. 7b, the magnetic elements 29a, 29b of the valve 26 are, in certain non-limiting embodiments, arranged in alternating polarities about the circumference of the movable element 26a. Due to a magnetic force of attraction between the moveable element 26a of the valve 26 and the activation means 27, the biasing force of the springs 31b is overcome and thus, the moveable element 26a is distanced from the guiding element 26b and drawn in direction towards the support surface 12, thereby opening the flow passages 28c as indicated in FIG. 6b. Accordingly, as long as the receptacle 11 is situated in close proximity and, in certain non-limiting embodiments, directly adjacent to the support surface 12 of the device, with the dispensing means being engaged with the valve means 17 of the receptacle, the fluid flow between the beverage brewing unit 5 and the dispensing outlet 6a is enabled.

Further, in case of alternating polarities of the magnetic members at the movable element 26a and the activation means 27, a user may rotates the receptacle 11 on the support surface 12 in order to arrange for an equal polarity being present between the receptacle 11 and the movable element 26a, thus leading to a separating force between the receptacle 11 and the safety outlet valve 26. Hence, after beverage preparation, the user may rotate the receptacle 11 to facilitate removal from the surface 12.

It is noted that although the presently disclosed and/or claimed inventive concept(s) has been described with reference to particular (but non-limiting) embodiments thereof, many modifications and alternations may be made by a person having ordinary skill in the art without departing from the scope of the presently disclosed and/or claimed inventive concept(s) which is defined by the appended claims.

The invention claimed is:

1. A beverage preparation device for preparing a beverage from an ingredients containing capsule, the device comprising:
  a beverage brewing unit for receiving the capsule and preparing the beverage from the ingredients within the capsule by means of injection of pressurized liquid into the capsule;
  beverage dispensing means connected to the beverage brewing unit, the beverage dispensing means comprising:
    a dispensing outlet for dispensing the resulting beverage from the device into a receptacle; and
    a safety outlet valve adapted to selectively open a fluid communication from the beverage brewing unit to the dispensing outlet dependent on the presence and/or proximity of the receptacle, wherein the receptacle is equipped with activation means for the safety outlet valve; and wherein the safety outlet valve is designed for being magnetically engaged by the activation means of the receptacle.

2. The beverage preparation device according to claim 1, wherein the safety outlet valve is designed to open the fluid communication upon magnetic engagement by the activation means of the receptacle.

3. The beverage preparation device according to claim 1, wherein the safety outlet valve is arranged below a support surface of the beverage preparation device for the receptacle.

4. The beverage preparation device according to claim 3, wherein at least a portion of the safety outlet valve is arranged movable in a direction essentially perpendicular to the support surface.

5. The beverage preparation device according to claim 3, wherein the safety outlet valve is biased in a closing position in a direction away from the support surface.

6. The beverage preparation device according to claim 1, wherein the safety outlet valve comprises a movable element having an essentially disc-shaped body with an inner liquid channel that is arranged moveable within an outer guiding element comprising radial flow passages.

7. The beverage preparation device according to claim 1, wherein a beverage dispensing outlet is arranged to protrude from the support surface of the device.

8. The beverage preparation device according to claim 1, wherein the safety outlet valve is arranged within a removable lid member of the device.

9. A beverage preparation device for preparing a beverage from an ingredients containing capsule, the device comprising:
a beverage brewing unit for receiving the capsule and preparing the beverage from the ingredients within the capsule by means of injection of pressurized liquid into the capsule;
beverage dispensing means connected to the beverage brewing unit, the beverage dispensing means comprising:
a dispensing outlet for dispensing the resulting beverage from the device into a receptacle; and
a safety outlet valve adapted to selectively open a fluid communication from the beverage brewing unit to the dispensing outlet dependent on the presence and/or proximity of the receptacle, wherein the receptacle is equipped with activation means for the safety outlet valve; and
wherein the safety outlet valve comprises a plurality of alternating magnetic poles about a circumference of the safety outlet valve.

10. A system comprising:
a beverage preparation device according to claim 1; and
a receptacle comprising activation means designed to magnetically engage the safety outlet valve.

11. The system according to claim 10, wherein the activation means are arranged in a circumferential bottom portion of the receptacle.

12. The system according to claim 10, wherein the activation means comprise a plurality of alternating magnetic poles arranged about a circumference of the bottom portion of the receptacle.

13. The system according to claim 10, wherein the receptacle is equipped with a central valve means designed for engaging the dispensing outlet of the device.

14. A receptacle for use with a beverage preparation device according to claim 1, comprising:
a circumferential bottom portion; and
activation means designed to magnetically engage the safety outlet valve of the beverage preparation device, wherein the activation means is arranged in the circumferential bottom portion.

* * * * *